F. G. KOLLENBERG.
TIRE.
APPLICATION FILED JULY 13, 1911.
1,031,856.
Patented July 9, 1912.
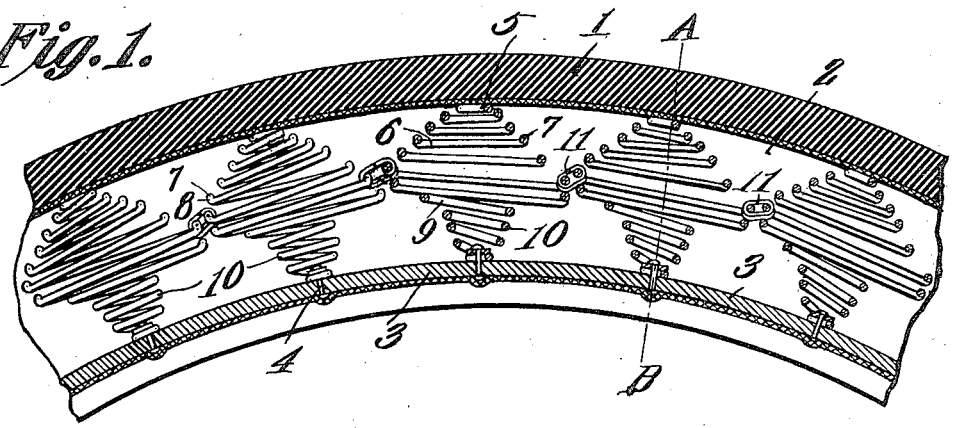
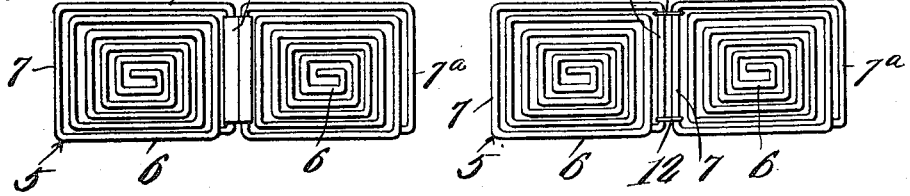
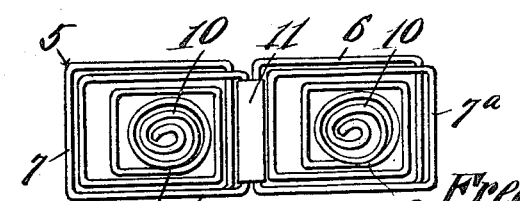
Frederick G. Kollenberg,
Inventor
Witnesses
by
Attorneys

UNITED STATES PATENT OFFICE.

FREDERICK G. KOLLENBERG, OF OWENSBORO, KENTUCKY, ASSIGNOR TO ELMER LITTLE, OF OWENSBORO, KENTUCKY.

TIRE.

1,031,856.

Specification of Letters Patent.

Patented July 9, 1912.

Application filed July 13, 1911. Serial No. 638,373.

*To all whom it may concern:*

Be it known that I, FREDERICK G. KOLLENBERG, a citizen of the United States, residing at Owensboro, in the county of Daviess and State of Kentucky, have invented a new and useful Tire, of which the following is a specification.

It is the object of the present invention to provide a novel form of supporting spring for a vehicle tire, the spring being so constructed that it will present an extended surface for engagement with the sheath of the tire, circumferentially of the tire, and, at the same time, provide a curvilinear support for the tread portion of the tire, when the spring and the tread portion of the tire are compressed.

A further object of the invention is to provide novel means for assembling the springs with each other, and for mounting them in place within the sheath.

With the foregoing and other objects in view which will appear as the description proceeds, the invention resides in the combination and arrangement of parts and in the details of construction hereinafter described and claimed, it being understood that changes in the precise embodiment of invention herein disclosed can be made without departing from the spirit of the invention.

In the accompanying drawings,—Figure 1 shows in longitudinal section, a tire constructed in accordance with the present invention; Fig. 2 is a transverse section on the line A—B of Fig. 1; Fig. 3 is a top plan of a pair of connected springs of the type shown in Fig. 1, the inner portions of the springs being omitted for the sake of clearness; Fig. 4 is a bottom plan of the springs employed in Fig. 1, the view showing both the inner and the tread portions of the springs; and Fig. 5 is a top plan, similar to Fig. 3, and showing a modified means for connecting the springs.

In carrying out the invention there is provided a sheath, within which the supporting springs are inclosed. This sheath consists of an outer member 1, of any desired form, and an inner tube 2, the tube 2 being fashioned from leather, canvas, or any other strong yet pliable material. Extended longitudinally within the inner tube 2, along the inner side of the tube, is a strap 3, fashioned from leather, metal, or any other yieldable material. By means of securing elements 4, the inner ends of a series of springs are connected with the strap 3, the outer or tread ends of the springs bearing against the outer or tread portion of the sheath. The tread ends of the springs comprise a series of rectangular convolutions 5, these rectangular convolutions diminishing in diameter as they approach the tread portion of the tire, so that the outer or tread end of the spring assumes a tapering form. In operation the sides 6 of the convolutions 5 bear against the inner surface of the inner tube 2, and owing to the rectangular form given to the convolution 5, the sides 6 will engage the inner tube 2 along lines of appreciable length, and not at mere tangential points only; thereby increasing the support which the spring affords for the inner tube. Moreover, the transverse portions 7 of the convolutions 5 are arched toward the tread of the tire, as shown at 8. Owing to this fact, when the sheath is compressed, the outer ends of the tread portions of the springs will present a curvilinear surface, conforming to the curvilinear outline of the sheath, and adapted to support the sheath, in its curvilinear form, against flattening out. The inner ends of the rectangular, tread portions of the springs, merge, as shown at 9, into curvilinear spiral portions 10, the convolutions of the portions 10 diminishing as they approach the inner portion of the sheath. The construction is such that the convolutions 5 will yield before the portions 10 yield, the portions 5 nesting together, to form the curvilinear surface above referred to, and when the convolutions 5 are compacted upon the portions 10, the portions 10 will yield. Certain of the members 7 may be connected, in successive springs, by strips 11, the ends of which are engaged with the members 7, the strips 11 extending substantially the full widths of the springs; or, if desired, the transverse portions 7ª may be connected by means of spaced links 12.

In practical operation, the strap 3 with its assembled springs, is drawn into the inner tube 2, the ends of the strap being united, and the ends of the tube 2 being united, in any desired manner; whereupon the tube 2 may be mounted within the outer member 1.

Owing to the fact that the springs are connected by means of the elements 11 in the one instance, and by means of the elements 12 in the other instance, the springs afford a connected, resilient structure, extended around the wheel circumferentially. This resilient structure will yield under the weight of the vehicle, and readily resume its original form, after the weight is removed, the relative positions of the springs remaining unaltered, owing to the connections therebetween.

Having thus described the invention, what is claimed is:—

1. A tire comprising a sheath; and spiral springs extended between the tread and inner portions of the sheath; the tread ends of the springs comprising rectangular convolutions, the transverse portions of which are arched toward the tread portion of the sheath.

2. A tire comprising a sheath; and spiral springs extended between the tread and inner portions of the sheath; the springs tapering toward their ends, the tread ends of the springs comprising rectangular convolutions, the transverse portions of which are arched toward the tread of the sheath, and the inner ends of the springs comprising curvilinear convolutions.

In testimony that I claim the foregoing as my own, I have hereto affixed my signature in the presence of two witnesses.

FREDERICK G. KOLLENBERG.

Witnesses:
 A. B. McCARTY,
 EARL HAYNES.

---

Copies of this patent may be obtained for five cents each, by addressing the "Commissioner of Patents, Washington, D. C."